March 15, 1938. L. C. EBEL 2,111,210
APPARATUS FOR DETERMINING WALL THICKNESS
Filed March 17, 1936  2 Sheets-Sheet 1
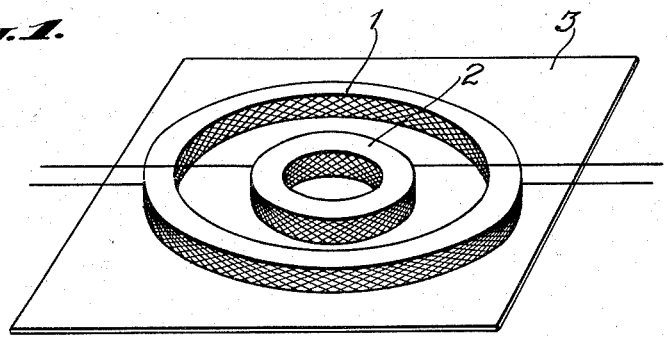
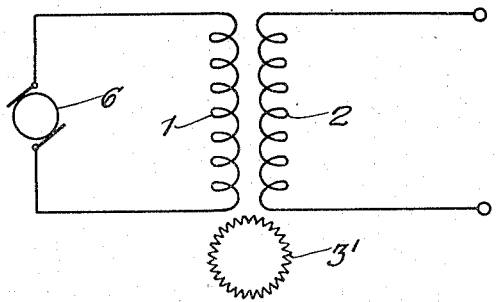
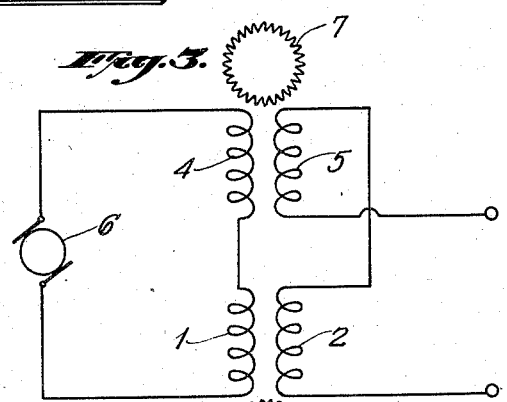
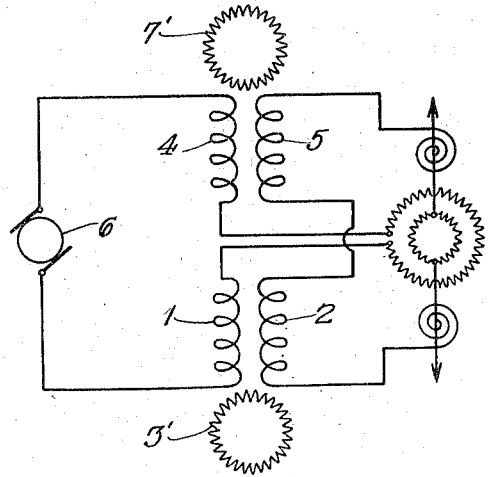
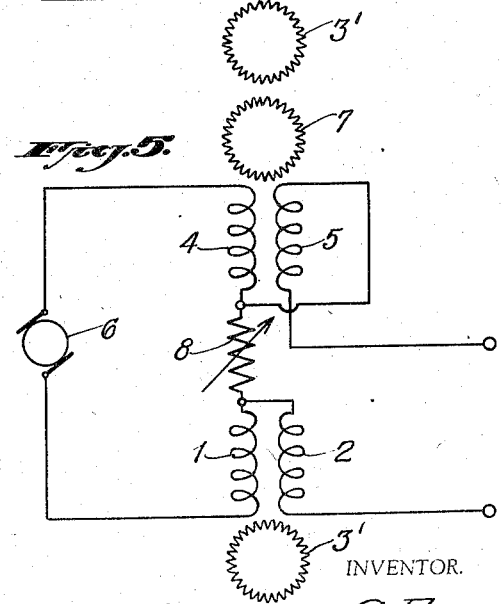
INVENTOR.
LAWRENCE C. EBEL.
BY
ATTORNEYS March 15, 1938.  L. C. EBEL  2,111,210
APPARATUS FOR DETERMINING WALL THICKNESS
Filed March 17, 1936   2 Sheets—Sheet 2
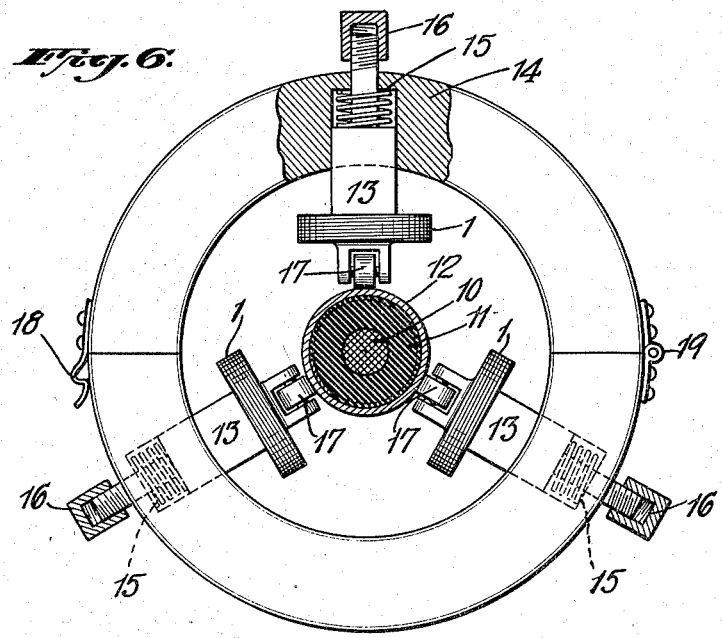
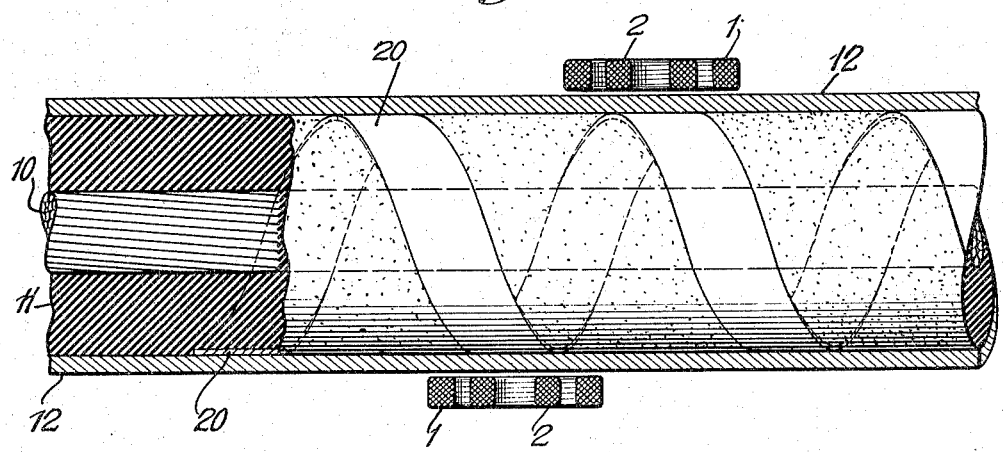
INVENTOR.
LAWRENCE C. EBEL.
BY
ATTORNEYS

UNITED STATES PATENT OFFICE 2,111,210

APPARATUS FOR DETERMINING WALL THICKNESS

Lawrence C. Ebel, Richmond Hill, N. Y., assignor to Anaconda Wire & Cable Company, New York, N. Y., a corporation of Delaware Application March 17, 1936, Serial No. 69,410

7 Claims. (Cl. 175—183)

This invention relates to an electrical system for the measurement of the thickness of metal sheets and tubes and for determining inequalities in the thickness of metal sheets and tubes. More particularly it concerns a system for determining the eccentricity of lead cable sheaths.

It is well known that considerable difficulty has been experienced in securing a concentric sheath of lead about electric cables. Because of this uncertainty as to the wall thickness, it has been usual practice to make the sheath somewhat thicker than necessary to insure a wall of the original dimensions. Such a procedure is of course wasteful since an excessive amount of material is employed without any improvement in the product.

The chief object of this invention is to provide apparatus for measuring the thickness of lead sheaths which will give accurate results without damaging the sheath, will be continuous in operation and will not hamper the usual steps of production.

Further objects and advantages of the invention will be apparent from the following detailed description when taken in connection with the accompanying drawings in which:—

Fig. 1 is a perspective view illustrating the relative positions of the coils and the metal under test; Fig. 2 is a wiring diagram schematically illustrating the electrical features of the present invention; Fig. 3 is a wiring diagram schematically illustrating a modification of the invention; Fig. 4 is a wiring diagram schematically illustrating a second modification of the invention; Fig. 5 is a wiring diagram schematically illustrating a third modification of the invention; Fig. 6 is a view illustrating one specific embodiment of the present invention; and Fig. 7 is a view partly in section illustrating a second specific embodiment of the present invention.

The principle on which this invention relies is the induction of so-called eddy currents in the metal to be measured, the strength of these eddy currents being a function, among other things, of the thickness of the metal. Referring to Fig. 1, the induction of eddy currents may be obtained by placing a hollow pancake coil 1 adjacent to the surface of the metal 3 with the coil plane parallel to that of the metal surface or in the case metal 3 is a tube the coil plane may be disposed parallel to the axis of the tube. A second hollow pancake coil 2 is placed in similar relation to the metal to be measured. When an alternating current is circulated through coil 1 an induced current circulates in coil 2 the voltage of which can be measured. This voltage in coil 2 gives an indication as to the strength of the eddy currents in the metal. Fig. 1 shows the relative position of the coils 1 and 2 and the metal 3.

For the purpose of analysis, let the metal to be measured, with its eddy current path, be replaced by a simple closed circuit as indicated in Fig. 2 whose effect on the system is the same as that of the metal. Let this closed circuit have a resistance $R_e$ and an inductance $L_e$. This analogous system of three coils may be analyzed and the results applied to the actual system. In Fig. 2, coils 1 and 2 are the coils of the measuring system; coil 3' represents the current path in the metal to be tested. Now if an alternating current 6 is applied to coil 1, an alternating E. M. F. $E_e$ will be induced in the eddy current circuit represented by coil 3', and will be $$E_e = -jm\omega I$$

The current in coil 3' due to this induced voltage will be $$I_e = \frac{-jm\omega I}{R_e + j\omega L_e}$$

The current will in turn induce a voltage in coil 2, which will be $$E'_e = \frac{m_1 m_2 \omega^2 I}{R_e + j\omega L_e}$$

or $$E'_e = I\left(\frac{R_e m_1 m_2 \omega^2 - j m_1 m_2 \omega^3 L_e}{R_e^2 + j\omega^2 L_e^2}\right)$$

But also the current I in coil 1 induces in coil 2 a voltage equal to $-jm\omega I$, so that the total resultant induced voltage in coil 2 is:

$$E = -I\left(j\omega m + \frac{R_e m_1 m_2 \omega^2 - j m_1 m_2 \omega^3 L_e}{R_e^2 + \omega^2 L_e^2}\right)$$

(Equation 1)

The induced voltage in coil 2 depends on the characteristics of the eddy current circuit, and may therefore be used to measure those characteristics. However, there is in this induced voltage a component dependent not on the characteristics of the eddy current circuit, but on the mutual inductance between the two measuring coils. The presence of this component has been found to offer difficulty in the use of this system of measurement. One method of eliminating the undesirable component is to place the metal to be measured between coil 1 and coil 2. There can be no induced voltage in coil 2 due to the direct mutual flux between coil 1 and coil 2, since all flux which links both these coils must also pass through the metal. The resulting induced voltage in coil 2 will then be only that depending on the metal, or $$E = -I\frac{R_e m_1 m_2 \omega^2 - jm_1 m_2 \omega^3 L_e}{R_e^2 + \omega^2 L_e^2}$$

(Equation 2)

In this condition, with the voltage caused by direct mutual flux between coils 1 and 2 eliminated, the sensitivity of the system to changes in the metal is greatly enhanced.

However, it is unsatisfactory and may indeed be impossible in some measurements of metal thickness to interpose the metal between coil 1 and coil 2. In the case of lead cable sheath for instance, it is impossible to place one coil outside the sheath and the other inside. This leads to the condition that the device shall operate with both coils on one side of the sheet, or, its equivalent, with both coils on the outside of the sheath. In order to do this, and still retain the feature of elimination of direct mutual effect between coil 1 and coil 2, I provide a second set of coils having a mutual inductance of the same magnitude as that between coil 1 and coil 2, and I so relate these four coils that the net induced voltage in the secondary circuit is zero in the absence of adjacent metals. The circuit is shown in Fig. 3. Coils 1 and 4 and the generator or oscillator 6 are connected in series circuit, and carry the same current I. There is induced in coil 5 a voltage $e_5 = -j\omega mI$ and in coil 2 a voltage $e_2 = -j\omega mI$; and by connecting the coils 2 and 5 in series opposition, I make the resultant induced voltage $E = 0$, for the condition in which no metals are present. If a metal sheet or tube 3' is placed adjacent to coils 1 and 2 in such a position as to cause eddy currents in the sheet or tube, the resultant induced voltage in the secondary circuit will be given by Equation 2. This is the result which is most desirable if the system is to have the highest degree of sensitivity.

The system of four coils as previously described may be used to determine inequalities in the thickness of metal sheets or in the wall thickness of metal tubes, by placing each pair of coils adjacent to the sheet or tube, one pair at each of the points to be compared. Representing the eddy current path at coils 1 and 2 by coil 3' and the eddy current path at coils 4 and 5 by coil 7, as indicated in Fig. 3, the resultant induced voltage $E$ will be $$E = -I\frac{R_e m_1 m_2 \omega^2 - jm_1 m_2 \omega^3 L_e}{R_e^2 + \omega^2 L_e^2} + I\frac{R_e^1 m_4 m_5 \omega^2 - jm_4 m_5 \omega^3 L_e^1}{(R_e^1)^2 + \omega^2 (L_e^1)^2}$$

If the system is so arranged that $m_1 = m_4$; $m_2 = m_5$, then for $R_e = R_e^1$ and $L_e = L_e^1$, E will be zero. If $m_1$ equals $m_4$ and $m_2$ equals $m_5$ but $R_e$ does not equal $R_e^1$, then E will not be zero and its value will depend on the extent of the inequality of $R_e$ and $R_e^1$—that is, E may under those conditions be used to indicate the relative characteristics of the metal at the two points. If the resistivity, permeability and temperature of the metal is the same at the two points being compared, E may be used to indicate the relative thickness of metal at those points. A current-squared type of meter may be used to measure E, and it will indicate the extent of inequality, but will not show which point in the metal is heavier.

In order to have an indication of both the extent and direction of inequality, I propose to superpose on the voltage E an auxiliary voltage of such phase that E will substantially add to or subtract from this auxiliary voltage, depending on the direction of E. In the usual eddy current circuit the terms involving $L_e$ are relatively small so that the voltage E is nearly in phase with the current I. It is therefore possible to use as the auxiliary voltage, mentioned above, the IR drop across a resistance 8 (Fig. 5) in the primary circuit of my system.

As an alternative method of determining the direction as well as magnitude of E, I may use a dynamometer instrument, one coil of which is supplied with current from the same alternating current source which supplied coils 1 and 4, the other coil of the dynamometer being connected, directly or through amplifiers across coils 2 and 5. This is illustrated in Fig. 4.

In order to obtain precise and accurate measurements of metal thickness or of eccentricity of lead sheaths, $m_1$, $m_2$, $m_4$, $m_5$, I, $m$, $\omega$ must be maintained nearly constant. The mutual inductances $m_1$, $m_2$, $m_4$, $m_5$ depend on the physical positions of the coils and the metal. It is proposed as indicated in Fig. 6 to maintain a constant separation between said coils and metal by mounting the coils on a carriage or frame having a roller or rollers which will allow the assembly to roll on the metal being measured, a spring, for example, being used to hold the carriage rollers in engagement with the metal.

Referring to Fig. 6, as one specific embodiment of the present invention, I have illustrated the adaptation of the same to the determination of the relative wall thickness of a metal sheath enclosing an electric cable. The cable comprises a center electrically conducting core 10 enclosed by insulating material 11 which in turn is enclosed by the sheath 12.

Coils 1 and 2 are mounted in the same plane concentrically about roller shank 13 and shank 13 is recessed in annular frame 14 with spring means 15 provided to urge the coils towards the center axis of annular frame 14 at which axis is located the cable sheath 12 of which is to be measured. Adjustable stop means 16 is provided to retain shank 13 within the recess. Roller 17 rides freely upon the surface of sheath 12. Annular frame 14 preferably is separable in any convenient manner as by spring clip means 18 and hinge means 19.

By disposing a plurality of coils 1 and 2 about the periphery of the cable sheath 12, in a plane substantially normal to the cable axis, substantially as indicated in Fig. 6, with each supported radially to the cable axis at approximately the same distance from the surface of the sheath 12 and in substantially equal spaced relation to each other about the said axis, a substantially accurate determination of the wall thickness of sheath 12 may be obtained as hereinabove described.

In order to maintain I practically constant, the current energizing coil 1 should be supplied from a source having in itself or in series with itself an impedance which is large as compared to the impedance of the induction coil 1. The usual voltage actuated devices which might be used to measure E will allow some current to flow in the measuring circuit, which current will cause changes in the voltage measured, because of leakage flux in coils 1 and 2. In order that the voltage measured may be substantially only that due to induction from the metal, I propose to use a voltage measuring device having an impedance high as compared to that presented by the impedances of the coils. Such a measuring device for example is known in the art as a vacuum tube amplifier.

In measuring the eccentricity of lead cable sheath or other metallic cable sheathing and as indicated in Fig. 6, I propose to use two pairs of coils, one pair at one point and the other on the opposite side of the cable. In many cables a binder tape of metal is used under the lead sheath. If the pairs of coils are placed in diametrically opposite positions on the cable, one pair of coils may be over a binder tape while the other may not. This would tend to give a false indication of eccentricity. To remedy this, I propose to place the second pair of coils on the opposite side of the cable, one-half the binder tape pitch removed from the diametrically opposite position. Each pair of coils will then bear the same relation of the binder tape under it at any time. Such a location of coils 1 and 2 with respect to the binder tape is indicated in Fig. 7, wherein the cable structure indicated in cross-section in Fig. 6 is shown longitudinally. Binder tape 20 has a certain pitch "X" which is known or determinable. Coils 1 and 2 instead of being disposed diametrically opposite each other or in the same plane normal to the cable axis are disposed concentrically about a spiral substantially identical to the pitch of the tape 20.

While I have described specifically certain embodiments of the invention herein illustrated, it is not to be construed that I am limited thereto as various modifications may be made by those skilled in the art without departing from the invention as set forth in the appended claims.

What I claim is:

1. Apparatus for measuring the uniformity of thickness of metallic cable coverings and sheaths, said apparatus comprising a plurality of pairs of hollow pancake coils, each of said pairs of coils comprising a pair of windings and each of said pairs of windings being of approximately the same mutual inductance, one winding of each of said pairs of windings being the primary and the other winding of said pairs of windings being the secondary, means electrically connecting the two primary windings in series with a source of alternating current, means electrically connecting the two secondary windings in series opposition with means to measure the voltage of an electric current induced in said secondary, means to sustain each of said plurality of pairs of pancake coils radially about a center axis in determined spaced relation to an adjacent pair of said coils, spring tension means urging each pair of coils towards the said center axis, means to sustain a length of cable along said center axis, and means to obtain relative movement of said sustained coils along the length of said cable, said means permitting the maintenance of uniform spaced relation between said coils and said cable surface.

2. In the apparatus of claim 1, said means to sustain the said plurality of pairs of pancake coils providing for a disposal of the said coils in the same plane normal to the longitudinal axis of the said length of cable sustained at said center axis.

3. In the apparatus of claim 1, said means to sustain the said pancake coils providing a disposal of the said coils in a spiral about the said center axis in substantially uniform spaced relation to the surface of said length of cable, the pitch of said spiral substantially being identical to the pitch of any spiral wrapping of shielding tape disposed about said cable underneath the outer metallic sheath thereof.

4. Apparatus for determining the thickness of metal sheets or tubes, comprising a pair of hollow pancake coils, said coils each consisting of a pair of windings disposed in concentric spaced relation, and each of said pairs of windings having a mutual inductance of substantially the same magnitude, one winding of each of said pairs of windings being electrically connected in series with an energizing means to form a primary circuit, and the other winding of said pairs of windings being electrically connected in series opposition with means to measure the voltage induced therein to form a secondary circuit and means to sustain each of said coils in spaced relation to the surface of said sheet or tube with the coil axes normal to the said surface and with the said sheet or tube interposed therebetween.

5. Apparatus for determining the thickness of metal sheets or tubes, comprising a pair of hollow pancake coils, said coils each consisting of a pair of windings disposed in concentric spaced relation, and each of said pairs of windings having a mutual inductance of substantially the same magnitude, one winding of each of said pairs of windings being electrically connected in series with an energizing means to form a primary circuit, and the other winding of said pairs of windings being electrically connected in series opposition with means to measure the voltage induced therein to form a secondary circuit, means to superpose an auxiliary voltage in said second pair of windings of such phase that the induced current in said secondary circuit will substantially add to or subtract from said auxiliary voltage depending on the direction of said induced current and means to sustain each of said coils in spaced relation to the surface of said sheet or tube with the coil axes normal to the said surface and with the said sheet or tube interposed therebetween.

6. Apparatus for determining the thickness of metal sheets or tubes, comprising a pair of hollow pancake coils, said coils each consisting of a pair of windings disposed in concentric spaced relation, and each of said pairs of windings having a mutual inductance of substantially the same magnitude, one winding of each of said pairs of windings being electrically connected in series with an energizing means to form a primary circuit, and the other winding of said pairs of windings being electrically connected in series opposition with means to measure the voltage induced therein to form a secondary circuit, means to electrically connect a variable resistance in series with and between the two windings in said primary circuit to superpose a determined auxiliary voltage of a desired phase in said secondary circuit and means to sustain each of said coils in spaced relation to the surface of said sheet or tube with the coil axes normal to the said surface and with the said sheet or tube interposed therebetween.

7. Apparatus for determining the thickness of metal sheets or tubes, comprising a pair of hollow pancake coils, said coils each consisting of a pair of windings disposed in concentric spaced relation, and each of said pairs of windings having a mutual inductance of substantially the same magnitude, one winding of each of said pairs of windings being electrically connected in series with an energizing means to form a primary circuit, and the other winding of said pairs of windings being electrically connected in series opposition with means to measure the voltage induced therein to form a secondary circuit, said means to measure the induced electric current in the secondary circuit comprising a dynamometer device including a stationary coil and a pivotally supported coil in inductive relation to said stationary coil, said stationary coil being electrically connected in series with and between the said first pair of windings of said primary circuit and the said pivotally supported coil being electrically connected in series with said second pair of windings in said secondary circuit and means to sustain each of said coils in spaced relation to the surface of said sheet or tube with the coil axes normal to the said surface and with the said sheet or tube interposed therebetween.

LAWRENCE C. EBEL.